April 19, 1966 P. ARONSON 3,246,815
DENTAL FLOSS DISPENSER
Filed Sept. 2, 1964 3 Sheets-Sheet 1
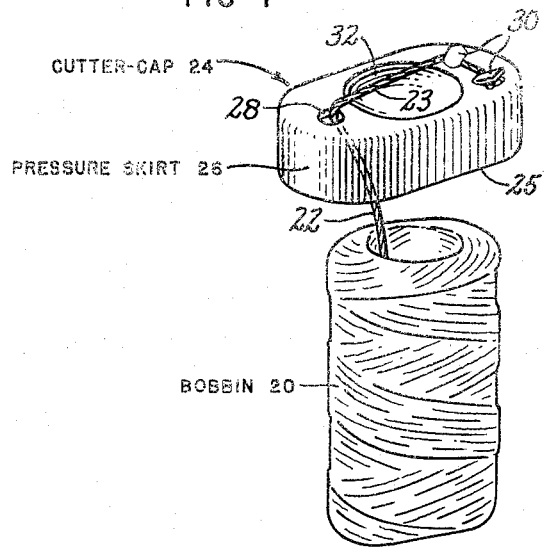
FIG 1
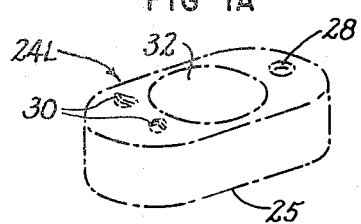
FIG 1A
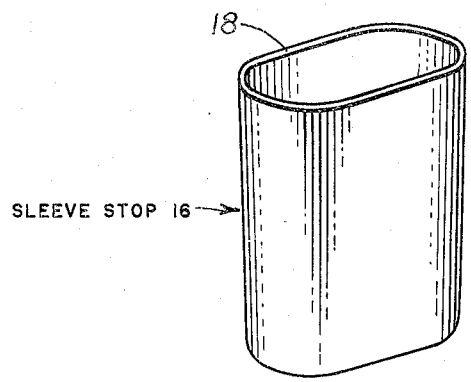
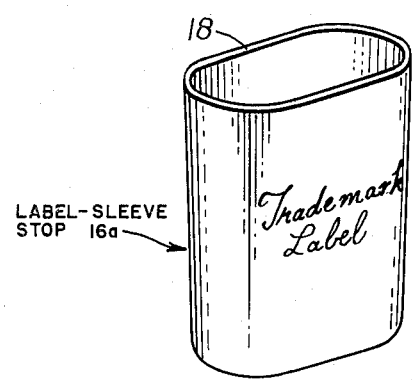
FIG 1B
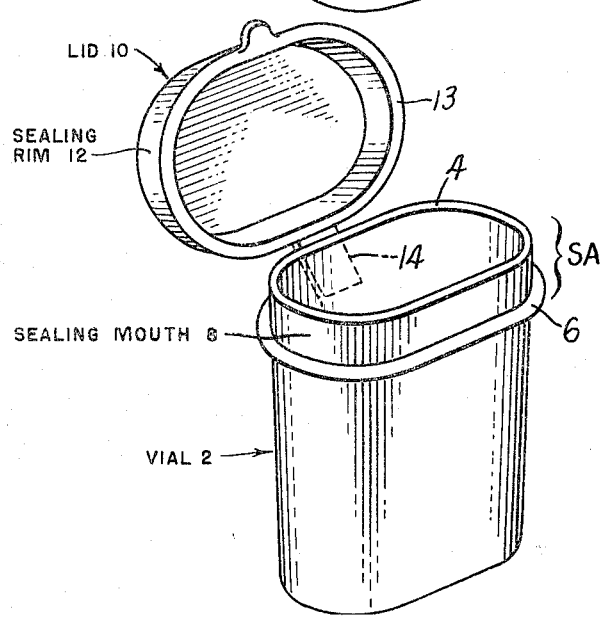
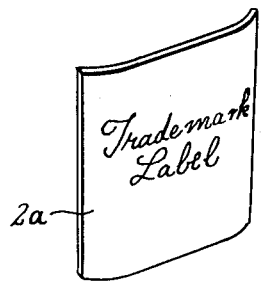
FIG 1C
INVENTOR
*Philip Aronson*
BY
*James C. Ledbetter*
ATTORNEY

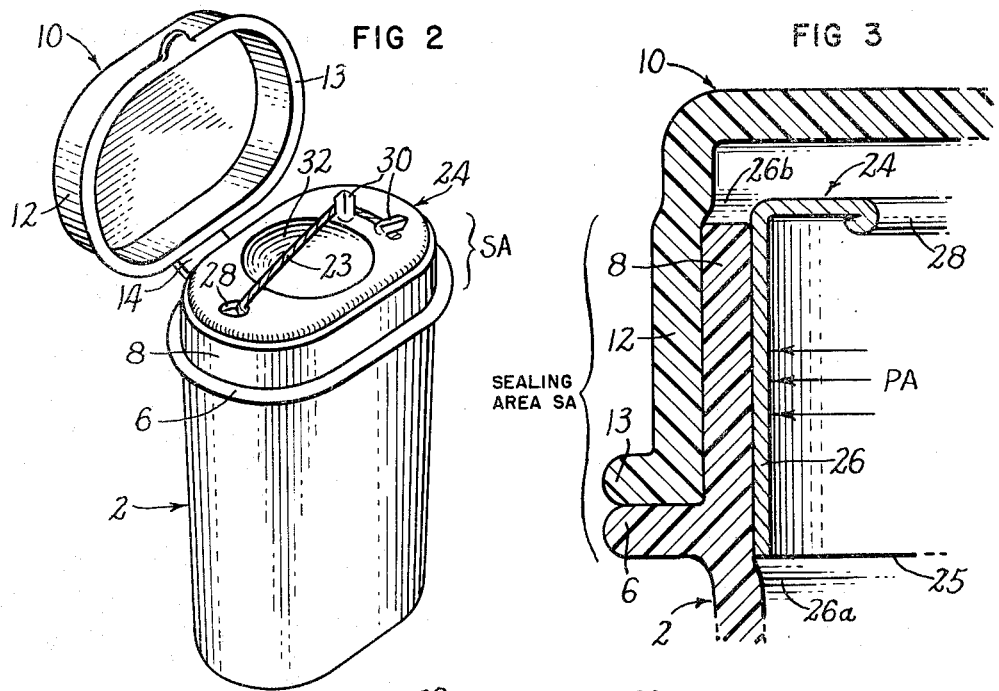
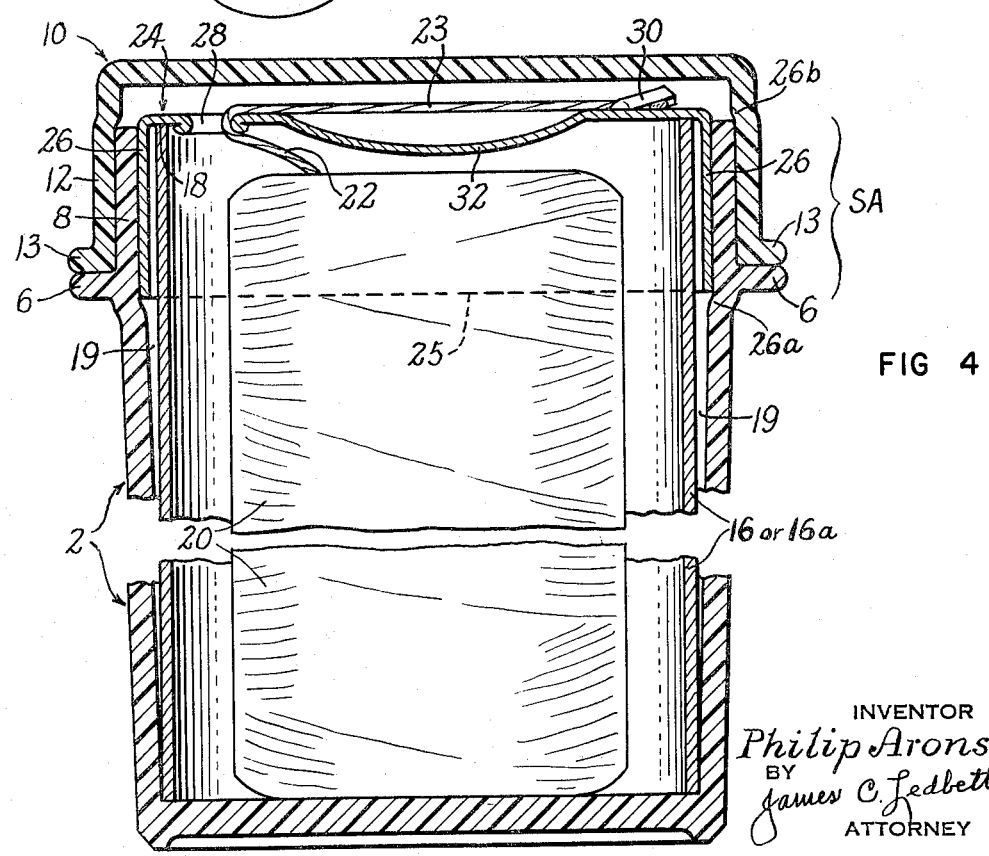

April 19, 1966  P. ARONSON  3,246,815
DENTAL FLOSS DISPENSER

Filed Sept. 2, 1964  3 Sheets-Sheet 3

INVENTOR
*Philip Aronson*
BY
*James C. Ledbetter*
ATTORNEY

United States Patent Office 3,246,815
Patented Apr. 19, 1966

3,246,815
DENTAL FLOSS DISPENSER
Philip Aronson, Elmhurst, N.Y., assignor to The Woltra Company, Inc., New York, N.Y., a corporation of New York
Filed Sept. 2, 1964, Ser. No. 393,917
3 Claims. (Cl. 225—44)

*Statement of invention and explanation of species improvement*

This invention relates to a Dental Floss Dispenser, comprising a hermetically-sealed container (sanitary package) for dental floss, useful to dentists and, in general, to individuals for effectively cleaning between the teeth, where a toothbrush is not effective. The present concept introduces improvements in what may be called the "cutter-cap" species of floss dispensers.

There are several types (species) of dental floss dispensers or devices in the patent art, per se. However, only one general type, so far as found in my research, has been in prior use, i.e., on the market, for sale to the public. It comprises an exposed (uncovered) "cutter-cap" type, manufactured in several different sizes and shapes. Its sale has persisted from the very beginning of the art.

After several decades, that type is still on sale, despite the fact that it is not now and never has been sealed against atmospheric absorption and soil contamination. Its structural form comprises a container, holding a supply of floss, with a metal "cutter-cap." The container is known as a vial, and the floss supply as a bobbin. At this late date, that old type still lacks a means to protect the delicate dental floss against infiltration of impurities, thus not a sanitary package as such.

The above fault is due to the total absence of a hermetically sealing means, i.e., a simple closing lid to seal the exposed "cutter-cap" and its two or more open dispensing apertures (holes), also its cutter blade, so characteristic of the present day floss dispenser, long on the market. The fault also applies to the exposure of the floss "pull-end." These several old features are hereinafter noted in prior art patents which reveal the commercial history of the unsanitary floss device.

Moreover, the above noted lack of a hermetic sealing means causes the metal cutter-cap to corrode (rust) and dull its blade intended as a cutter to sever a pulled-out length of floss for use. The rusty cutter-cap and its cutter blade shed corrosive soil on the floss as you withdraw a piece thereof for dental use.

Actually, two or more open holes in the market-type cutter-cap and also the floss "pull-end" constitute three or more components which expose the floss to soil conditions. By floss "pull-end" is meant the exposed short-end floss "portion 23" shown in the Fraser patent cited below. It is the exposed floss end that one grasps in order to pull out a length thereof for use and then discard it.

Significantly, a 50- or 100-yard floss dispenser has an extended period of use—thus a long time to accumulate moisture corrosion and other soil impurities, when stored in drawers and on the shelves of drug stores and in homes alike, especially when subjected to bathroom moisture. Such long period of use dictates the need for hermetically sealed sanitary features.

The above noted prevailing faults are manifest when carrying a conventional floss package in one's purse, pocket or traveling bag. The exposed (outside, uncovered) metal cutter-cap and its blade not only corrode but also snag and wear against the lining material of one's pocket or bag. It sifts all manner of soil through the two or more cutter-cap openings into the vial and onto the floss used in one's mouth.

Since dental floss is used in the mouth and in direct contact with one's gums, it is strange that the present-day unsanitary floss dispenser has been tolerated for decades. The problem has persisted despite the fact that the dental profession and the public are conscious of modern-day precaution against all other sources of bodily infection.

This invention contributes a new utility and convenience, with novel mechanical features and a gasket-like sealing function, which distinguish it as the very first covered—the original—dust-sealed and moisture-proof floss dispenser on the market.

Having in mind the above explained long-standing problem, it can now be stated that the purpose of this invention is to provide the trade with its first sanitary dental floss dispenser that hermetically seals, similarly to a gasket, the metallic "cutter-cap," with its die-formed and die-punched edge portions, and the container or vial unit (comprising a body, a lid and a hinge) enclosing the floss bobbin.

It is well known that edges per se of die-sheared and punched sheet-metal parts are overly susceptible to rust. This fault prevails because the plated finish on edges as such is less durable than that on flat surfaces, a phenomenon of all cold-rolled sheet-metal due to its metallic grain direction. Since cutter-caps in general have a long period of use, it follows that sealing them against moisture is a particular advantage in minimizing impurities caused by metallic-edge corrosion.

Accordingly, my new arrangement seals the floss-feed hole, also the two holes die-punched under and as a part of the two cutter blades, likewise the two cutter blades per se, as well as the floss-strand pull-end. These six (6) critical components, so susceptible to the prior-art faults of rust contamination and atmospheric impurities, are sealed and, moreover, the cutter blades are preserved against rust-dulling.

In addition to the foregoing sealing function (first purpose), it is further purpose of this invention to provide a long floss-strand pull-end at rest across the cutter-cap, characteristically combined with a large area finger-well depressed in the cutter-cap. These two features are believed to be individually new, also new in combination, and are for the convenience of dentists and users in general when grasping the floss pull-end to withdraw a piece for dental use.

The invention is considered in three (3) categories, as illustrated in the accompanying drawings, in which:

(1) the sealing function is shown in Sheets 1 and 2,
(2) the long floss pull-end is shown in Sheets 1, 2 and 3,
(3) the large area finger-well is shown in Sheet 3.

The views (figures) are summarized in the next two topics.

*Sheets 1 and 2, sealing function, also first form of cutter-cap*

In the accompanying Sheets 1 and 2 of the drawings, it is pointed out that (a) the elliptical shape of the parts (as viewed in cross section or from the top) is not essential to the hermetic sealing function per se, but nevertheless,
(b) show the first form of my new cutter-cap, of which two other forms thereof are illustrated on Sheet 3.

Actually, the sealing function may be achieved with a vial of another shape, say of cylindrical form—if made of a material possessing the select gasket-like sealing characteristics as chosen for the present invention—for implementing category (1) emphasized in the last paragraph of the preceding topic.

In contrast, the illustrated elliptical shape of the parts in all three (3) sheets of the drawings is critical and essential in carrying out categories (2) and (3).

The scale of the four (4) figures on Sheet 1 approximate the commercial size of one of the floss devices furnished the trade, which is so small that some of its structural details may not show. For that reason, Sheet 2 presents oversize enlargements, so that the structural details remain clear when the accompanying drawings are reduced to patent-copy size.

FIG. 1 illustrates a spread-apart view in assembly alignment of the four parts (elements) of the combination. The first or bottom member comprises a vial unit (container) of semi-soft plastic material. Preferably, it is transparent. The other three parts are opaque; and they are assembled within the vial body, as shown on Sheet 2. Then the lid of the vial unit is closed, as noted in FIGS. 3, 4 and 9.

The second part from the bottom of FIG. 1 comprises a stop, upon the top edge of which my new cutter-cap is seated. The stop is shown (as an example) in the form of a sleeve.

The third part from the bottom constitutes a supply roll of dental floss, known in the trade as the floss bobbin.

The part of the top (fourth member) of FIG. 1 comprises my new die-formed metallic "cutter-cap" of elongated or elliptical shape, so positioned that its cutter blade means (two cutters are shown) is placed at the right when assembled in the vial body, thus convenient to a right-handed person.

FIG. 1A (dot-dash view at the right-hand top side of FIG. 1) shows that the elliptical (elongated) cutter-cap may be reverse-ended when assembled within the vial body, so as to reposition its cutter blades from right to left, thus also convenient to a left-handed person.

FIG. 1B shows a label-sleeve stop, as a modified form (substitute) for its counterpart plain (unprinted) sleeve stop at the left in FIG. 1. This modified form of label-sleeve stop serves two purposes, thus:

(a) as a stop or seat that gauges (fixes) the position of the cutter-cap in the top end of the vial body; and also
(b) as the seller's trademark label, the printed matter of which is preserved against aging within and visible through the transparent body of the vial unit.

FIG. 1C shows an outside stick-on label, for use in the event the vial body is not sufficiently transparent to afford good visibility of the inside label-sleeve stop shown in FIG. 1B.

FIG. 2 shows the completed floss dispenser, as assembled from the parts illustrated on Sheet 1.

In FIGS. 1 and 2, the sealing lid of the vial unit is in open position, so as to show the hinge at the rear. However, in FIGS. 3 and 4, the lid is closed so as to demonstrate its mode of sealing coaction, accomplished by the specially selected, gasket-like plastic material, of which the vial unit is molded.

FIG. 3 illustrates an oversize fragment of the upper left-hand side of FIG. 4 and demonstrates an annular "sealing area SA," which functions as a "gasketing area." This view emphasizes how the sealing gasket-like squeezing mode of my new cutter-cap modifies (reforms) the old plastic vial unit, long used in the drug sundries trade without a sealing function, and now improves it in that respect.

FIG. 4 is an oversize vertical section of FIG. 2, illustrative of selective features, thus:

(a) the perimeter of the gasket-like "sealing area SA";
(b) the taper of the vial body, fractionally larger at its top end; and
(c) the seated position of the cutter-cap on the open top edge of either the plain (unprinted) sleeve stop (FIG. 1), or the printed label-sleeve stop (FIG. 1B).

*Sheet 3, second and third modified forms of Cutter-cap, and transparent vial lid*

The first form of my new cutter-cap is illustrated on Sheets 1 and 2. It is characterized by an elliptical (elongated) shape which, significantly, provides a long floss strand pull-end, new in the art and in the trade. Thus two points of novelty inhere in the first cutter-cap.

Sheet 3 illustrates a second and third modified form of the cutter-cap, characterized by two types of large area finger-wells, thus two additional points of novelty over the first form shown in Sheets 1 and 2.

Figure 5:
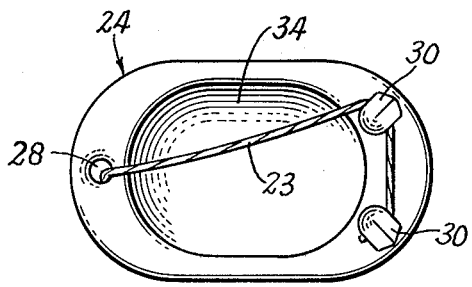
Figure 6:
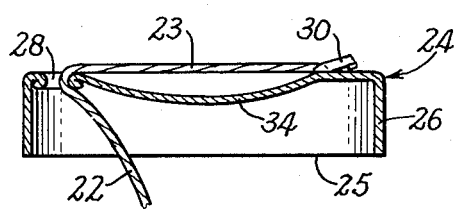

FIGS. 5 and 6 illustrate a top view and a lengthwise section, respectively, of the second cutter-cap, having the same long floss strand pull-end as shown in Sheets 1 and 2, but adding an elongated large area finger-well.

Figure 7:
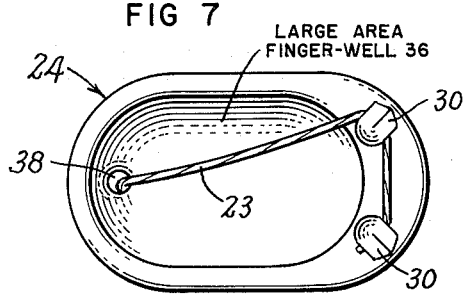
Figure 8:
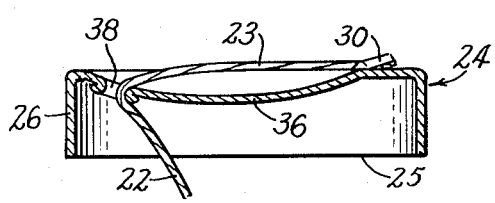

FIGS. 7 and 8 illustrate a top view and lengthwise section, respectively, of the third cutter-cap, but having a finger-well of larger area than that of the second form (FIGS. 5 and 6).

Figure 9:
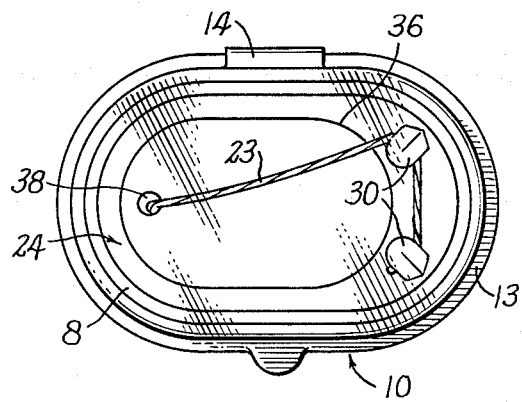

FIG. 9 is a top view of the floss dispenser with its transparent vial lid closed, displaying the new long pull-end of the floss strand and the large area of the finger-well formed in the cutter-cap. Both features, singly and in combination, add to the convenience in use of my new floss dispenser.

Note that Sheet 3, its five (5) figures, points up (emphasize) the importance of the elliptical shape of the parts, and is therefore devoted to categories (2) and (3) of the invention, as summarized in the last paragraph of the first topic herein.

First, a description is given of the basic assembly, i.e., the first three parts of the combination, with a choice of two labels, either the outside stick-on label (FIG. 1C) or the inside label-sleeve stop (FIG. 1B).

*Pre-assembly of first three parts, Sheets 1 and 2, and choice of label*

A container for holding the parts (elements) of my new floss dispenser comprises a semi-soft, pliant, plastic vial 2, selected from the drug sundries trade. It has been selected for its shape, form and characteristics of material. Note that it has three semi-soft parts (a body, a pivoted covering lid, and a hinge). All three parts are integrally formed, by a single-shot plastic molding technique. Preferably, the vial 2 (the unit) is transparent, i.e., clear for light passage.

The vial 2 is molded of polyethylene, a species of plastic, which is semi-clear but, nevertheless, provides light passage and vision of its contents. Important also is the fact that its material has a non-glass frictional surface texture with a frictional gripping characteristic that provides a lid sealing and gasketing feature marked on the drawings as the "sealing area SA," heretofore noted.

The vial 2 has been and is now used in the drug sundries trade for holding all manner of small merchandise parts, but has never been hermetically sealed, i.e., it never provided the sealing area SA. Nor has this vial been adapted to dental floss. Its conventional closing lid did not and does not provide a hermetic seal. However, it does so in the present invention, by reason of the modifying coaction of my new cutter-cap combined with it, as later described.

Note that the vial body 2 (preferably transparent) has a closed bottom and closed sides, and that a printed trademark label 2a (FIG. 1C), of the outside stick-on type is provided. The vial also has an open top edge 4, and an annular stop flange 6 located just below its open top. A sealing mouth 8, as defined between the open top edge 4 and the lower annular stop flange 6, possesses a new function herein, which was not and is not present in the conventional use of the vial.

The body of the vial unit 2 is molded with slight upper enlarging taper. Hence the vial is fractionally of larger perimeter at its open top edge 4 than at its closed bottom.

Since this taper is fractionally slight, FIG. 4 is oversized to illustrate the importance of the taper, in relation to my new cutter-cap, as described and assembled in the next topic. The taper feature is just one of the reasons for selecting this vial as a container for my new floss dispenser.

A hinged cover or lid 10 has a sealing rim 12 that fits down onto and around the sealing mouth 8 of the vial body 2. The lower edge of this lid-sealing rim 12 has an annular strengthening (reinforcing) rib 13, which seats against the stop flange 6 of the vial body.

A hinge 14 of single flexible-ribbon type, on the rear side, has its two ends molded integrally with the vial body 2 and the lid 10, respectively. This hinge 14 pivotally secures the lid 10 to the upper end of the vial body 2. The lid-sealing rim 12 swings down over the open top edge 4 and around the sealing mouth 8 of the vital body 2.

Next, there is provided a sleeve stop 16 (believed new in this art), say of white cardboard. It is open at both ends. It is also approximately equal in length to the inside depth of the vial body 2. The bottom edge (the perimeter) of the sleeve stop 16 rests upon the inside bottom surface of the vial body and, moreover, fits snugly within the annular bottom corner thereof. See oversized FIG. 4 for this feature.

The top edge 18 of the sleeve stop 16 is located close or near flush to the open top edge 4 of the vial body 2. Note that this sleeve stop 16 (FIG. 1) is plain, i.e., not printed with the trademark label, thus unlike the outside stick-on printed label 2a (FIG. 1C.)

The preceding paragraph is presented to also describe a modified form of label-sleeve stop 16a (FIG. 1B), for the inside of the vial 2. It is the same in form and size as the plain (unprinted) sleeve stop 16, except printed with or the same as the trademark label 2a (FIG. 1C) and may be substituted for the latter, when the vial body 2 is made of plastic material sufficiently clear for good vision.

The label-sleeve stop 16a has the advantage of preserving the printed matter against wear, tear and aging. It also reduces the assembly by one part and, additionally, by one manual operation. Thus it not only makes for economy in the manufacture of my new floss package, but also preserves its good appearance for the life of the package. Accordingly, the label-sleeve stop 16a provides a choice of packaging labels.

Next, it is pointed out that the sleeve stop 16 (also the label-sleeve stop 16a) is exactly the same size from end to end but that the vial 2 has a slightly increasing upward taper (see FIG. 4). It follows, therefore, that an annular clearance 19 is provided between the upper end portions, respectively, of the sleeve stop and vial body. Observe this annular clearance 19 near the flange 6 on the vial.

The upwardly increasing taper (Fig. 4) which provides the clearance space 19 is at a maximum at the top edge 18 of the sleeve stop 16. This clearance feature affords a perceptible amount of initial looseness of the top portion of the sleeve stop, and it is utilized by my new cutter-cap. This is another reason for having selected (during my research) the conventional vial unit 2, as the container for my sealed floss device.

The third and last part of this pre-assembly comprises a known form of bobbin 20 made of a single and continuously wound strand. It is waxed and minted in the usual way for dental use. It may be wound in 50-yard, 100-yard and 150-yard package quantities for the trade. The bobbin 20 has a hollow center. It is placed within either the plain (unprinted) sleeve stop 16 or the printed label-sleeve stop 16a, and remains stationary in the vial 2.

Since the bobbin 20 is stationary (not on a reel) and dispenses from the center, its strand does not tangle when withdrawn. A length 22 of the floss strand for dental use is pulled out by hand from the hollow bobbin 20 and extends upwardly, as a feed end 22.

Observe that the strand feed end 22 terminates in a "pull-end" 23, which feeds through and rests across my new "cutter-cap" 24. It is most important to observe that the cutter-cap 24 is characterized by a pressure skirt 26 that hermetically seals the vial unit 2 when its covering lid 10 is closed. This sealing feature is described in the next topic.

*Completed assembly, Sheets 1 and 2, pressure skirt 26, and sealing mode*

A new form (species) of cutter-cap 24, importantly devised with a pressure skirt 26, operates in a novel manner to modify the old non-sealing function of the vial unit 2, so as to provide it with a sealing means suitable for my new dental floss dispenser. As previously stated, the elliptical shape of the parts is not critical in respect to the mode of sealing described in the instant topic.

The elliptical shape is critical only in respect to the convenience of using this floss dispenser, i.e., manipulating and pulling out a piece of the floss strand from the feed end 22, as described in a later topic.

The cutter-cap 24 comprises a sheet metal die-formed, cup-shaped, upside-down member, with a centrally depressed flat top (forming a finger-well), and a lower annular edge 25 that defines the aforesaid depending pressure skirt 26.

A floss feed hole 28 is provided through the top of the cutter-cap 24. Also, a floss cutter (or cutters) 30 is die-formed on the upper surface thereof, in the usual way. Note that the floss feed-end 22, leading upward from the stationary bobbin 20, pulls through the feed hole 28, rests across the top of the cutter-cap 24, and is gripped by the cutter blades 30.

A round finger-well 32 (Sheets 1 and 2 only) provides a depression or cavity formed in the upper plane surface of the cutter-cap 24. It is underneath the taut floss pull-end 23, so that one's finger may reach into the finger-well 32, easily grasp the pull-end 23, withdraw a useful length of the dental floss, and jerk or cut it off under the near-side cutter 30, of the cutter pair.

A pair of cutters or blades 30 is preferred, since one cutter breaks or severs a useful length of the floss feed end 22, while the other cutter aids in holding the long pull-end 23 taut for the next pull-out and cut-off operation. Furthermore, the pair of cutters assures that the long pull-end 23 will not drop back through the feed hole 28 when the floss bobbin 20 becomes small or used up and rattles around in the vial unit 2.

The upper three parts 16, 20 and 24 (FIG. 1) are assembled by telescoping them into the vial 2. Note that the floss bobbin 20 is mounted stationarily within the sleeve stop 16 or in the label-sleeve stop 16a.

The cup-shaped cutter-cap 24 is pressed upside down into the soft (pliant) sealing mouth 8 of the vial 2. The pressure skirt 26 of the cutter-cap fits into the clearance space 19 provided by the upward enlarging taper of the vial, as heretofore described. Characteristically, said pressure skirt 26 fractionally and slightly expands and imparts a "firmness" and a "set" to the soft sealing mouth 8 of the vial, thus giving said mouth a permanently firmed and rigid contour.

Also, the pressure skirt 26 of the cutter-cap 24 embraces (surrounds) the top 18 of the sleeve stop 16 or label-sleeve stop 16a. The top edge 18 of either sleeve stop acts as a seat for the cutter-cap 24, so that the top surface of the latter (and the floss strand pull-end 23) is held about even or flush with the top edge 4 of the vial body.

One of the trademark labels is used, either the printed sleeve-stop 16a (FIG. 1B) for the inside of the vial unit 2, else the outside stick-on label 2a (FIG. 1C). As said before, the printed label-sleeve stop 16a serves the several advantages of reducing the part numbers by one, also saves one assembly step, likewise preserves the printed matter of the trademark label against aging, and acts structurally as a stop rest (or seat) for the cutter-cap 24.

It is seen that the sleeve stop 16, or the label-sleeve stop 16a, serves the purpose of supporting the metal cutter-cap 24. In other words, the inside flat surface of the cutter-cap 24 sits down upon (rests on) the top edge 18 of the sleeve stop 16 or 16a. This is an advantage because it ensures, during assembly, that the cutter-cap 24 is not pushed too far into the sealing mouth 8 of the vial body 2.

The advantageous sealing feature stems from a combined four-in-one relation of and between the pressure skirt 26, the sealing mouth 8 of the vial, also the sealing rim 12 of the pivoted lid, and the non-gloss frictional surface texture of the plastic vial. FIGS. 3 and 4 aid an understanding of this combination.

The perimeter of the pressure skirt 26 has its dimension predetermined and die-formed with a close and tight pressure (slightly) expanding fit into the inside of the sealing mouth 8 of the vial. Accordingly, the pressure skirt 26 converts the soft and supple pliant plastic top portion (sealing mouth 8) into a firmly set and unyielding perimeter.

In other words, the sealing mouth 8 is held rigid, so much so that when the pliant lid 10 is closed, there exists a frictionally tight and gasket-like hermetically-sealed relation between the hinged lid 10 and the vial 2. This sealing fit prevents dust and moisture from entering the vial, because the lid rim 12 tends toward a stretching and elastic grip over the sealing mouth 8.

The hermetical sealing feature is further explained by referring to the oversized FIG. 3. Note that the periphery of the pressure skirt 26 urges or firms—as at 26a—the vial sealing mouth 8, so indicated by the pressure arrows PA. Accordingly, the lid sealing rim 12 closes with a stretching fit—as at 26b. Moreover, the annular rib 13 around the lid rim 12 accentuates (acts like a tightening rubber band) the close sealing fit of the two portions (rim 12 and mouth 8), when said rib 13 seats down on the stop flange 6.

Thus it is appreciated that the pressure skirt 26 of the cutter-cap 24 provides the old non-sealing vial unit 2 with a sealing means for my floss device, as emphasized by the pressure arrows PA. Note that the sealing combination, i.e., the circumferential area of the lid rim 12 and the vial mouth 8—as modified by the sealing mode 26a and 26b—is shown on the drawings as a "sealing area" SA.

The elliptical shape is important in next describing the convenience of using the foregoing sealed floss dispenser.

*Cutter-cap 24L, FIG. 1A, reverse-ended, left-hand convenience*

From the foregoing, it is observed that the parts are of elliptical shape (oblong with rounded ends), hence symmetrical, in horizontal cross section, i.e., as viewed from the top. The elliptical shape was selected in order to achieve two advantages, thus:

(1) to minimize the size of the floss package, and
(2) to achieve convenience in use, i.e., manipulation or pulling out of the floss strand.

Note that FIG. 1A illustrates the cutter-cap 24 in a reverse-ended position, marked 24L on the drawings, so that its cutter blades 30 are located at the left and, therefore, are more convenient for a left-handed person than the right-hand position shown in the other views.

Since the lid 10 and hinge 14 are on the rear side of the vial body 2, it follows that said lid and hinge are in one's way (obstructive) if a left-handed person turns the vial unit about face, in an effort to position the cutter pair 30 to the left-hand side.

Accordingly, if a user finds that the right-hand location of the cutter pair 30 (FIG. 1) is awkward in use, he can readily insert a hook into the floss feed hole 28, pull the cutter-cap 24 out from the vial sealing mouth 8, turn it 180° (FIG. 1A), i.e., half-way around, and then press it back into sealing position, the same as in FIGS. 2, 3 and 4.

Such readjustment of the right-hand cutter-cap 24 to its left-hand 24L position (FIG. 1A) is readily appreciated by observing the complete floss package, as normally furnished the trade (FIG. 2), and realizing that the cutter-cap 24, if its blade pair 30 is on the right-hand side, is adapted to be reverse-ended for convenient left-hand use.

*Elliptical shape, three cutter-caps 24, convenient use, and FIG. 9*

As previously stated, the elliptical shape of the parts (oblong with rounded ends) is a feature of this invention devoted solely to the ease and simplicity of dispensing (pulling out) the floss strand pull-end 23. The improved cutter-cap 24 (in a variety of designs) provides this facility, by reason of being elongated, thus having a major and minor axis. Three forms or types of the cutter-cap 24 are illustrated.

The first form of my new cutter-cap 24, illustrated on Sheets 1 and 2, is the same as the first device hand-modeled at the outset of the research and development of the present invention. Note that the floss feed hole 28 is at one end, that the cutter blade pair 30 is at the other end, and thus they are separated by the maximum distance afforded by the major axis of the elliptically shaped cutter-cap.

Such feature makes for maximum length of the floss strand pull-end 23 (Sheets 1, 2 and 3) and, moreover, provides a minimum size of the floss package as a whole—thus two advantages of the elliptical shape. The long pull-end 23 is by far more conveniently and easily grasped than present-day floss packages on the market (also those in the patent art), all of which have short pull-ends.

Incidentally, the shortest floss pull-end thus far found in the art (prior use and patent art) is Bailey 1,466,982 (his FIG. 4), cited in the first topic hereof. It is the best example of unsanitary and inconvenient floss device thus far found in this research. Particularly, the old cylindrical type floss package with round cutter-cap necessarily has a short pull-end, so as to minimize the diameter of its floss bobbin vial or container.

The second and third cutter-caps (FIGS. 5 and 6, also FIGS. 7 and 8) have the same part numbers as the parent cutter-cap 24—thus also numbered 24—since they are of same basic structural form, with the same pressure skirt 26 and the same long pull-end 23, due to the elongated spacing between the floss feed hole 28 and the cutter pair 30.

Both modified forms (Sheet 3) are characterized by large area finger-wells, in combination with the maximum length floss pull-end 23. This new combination of the two features makes for convenience in grasping the pull-end 23 and withdrawing a useful length of the floss from the feed end 22 of the bobbin 20.

For example, note (FIGS. 5 and 6) that a large area elliptical finger-well 34 is die-formed in the cutter-cap 24. Accordingly, the long pull-end 23 is characterized by the maximum length afforded by the major axis of the cutter-cap. The pull-end 23 is thus free of and without contact with the top surface of the cutter-cap device. This simple advantage is accomplished by making the finger-well 34 of elliptical shape and also utilizing the greater portion of the surface area of the elongated cutter cap 24 for this large area finger-well 34.

Finally, in FIGS. 7 and 8, a finger-well 36 is shown of larger area than in FIGS. 5 and 6. This is achieved by extending the elliptical die-formed finger-well 36 along the full length of the major axis, from the cutter pair 30 at one end of the cutter-cap 24 to its other extreme end.

In other words, this long and wide finger-well 36 utilizes the entire top area of the cutter-cap. Also a feed hole 38 for the floss pull-end 22 is located within the large area finger-well 36, adjacent the pressure skirt 26. By placing the feed hole 38 in the finger-well 36, the latter is made of maximum area.

FIG. 9 shows a top view of the transparent lid. This view shows the large area finger-well 36 (FIGS. 7 and 8), and it is illustrative in principle of any and all forms of finger-wells. Note the attractive appearance of the floss package, in that its transparency displays the long floss pull-end 23.

The latter and other features of the transparent lid add to the sales appeal of the floss dispenser and make for quick identification of the floss package if it becomes intermixed with other merchandise in the drug stores or in one's home shelves.

What is claimed is:

1. A dental floss dispenser comprising a container 2, having an open top edge 4, providing a sealing mouth 8, made of soft and pliant material; and a lid 10, having a sealing rim 12, which is also made of soft and pliant material;
    (a) a cutter-cap 24, in the form of an upside down cup-shaped member, having a floss feed hole 28, and also a floss cutter 30 which is spaced from the floss feed hole, a pressure skirt 26 integral with the cutter cap, and having an outside perimeter fractionally larger than the inside perimeter of said soft and pliant sealing mouth 8;
    (b) said fractionally larger pressure skirt mounted inside of the soft and pliant sealing mouth 8, with a close slip fit therein, which firms and holds said soft and pliant sealing mouth against yielding to contraction;
    (c) the sealing rim 12 of said lid 10 having an interior perimeter, which is fractionally smaller than the firmed sealing mouth 8, and thus makes a gasket-like close fit, around the firmed sealing mouth, when the lid is closed down thereon;
    (d) said container having a taper, that enlarges upwardly, being fractionally larger at its upper open top edge 4 than at its bottom end;
    (e) a tubular sleeve stop 16, of the same size from end to end thereof, having an open top edge 18, mounted in the tapered container, thus providing an annular space 19 between the open top edges 4 and 18, respectively, of the container and the tubular sleeve stop;
    (f) and said pressure skirt 26 embracing the open top edge 18 of the sleeve stop, with the cutter-cap 24 seated upon said open top edge 18, thus maintaining the floss feed hole 28 and the floss cutter 30 of the cutter-cap flush with the open top edge 4 of the container.

2. A dental floss dispenser comprising a container 2, having a flat front wall and a flat rear wall, with end walls that are narrower than said flat front and flat rear walls, a closed bottom, and an open top edge 4; thus said container is wider than the distance between its flat front and flat rear walls, hence elongated in horizontal cross-section;
    (a) a cutter-cap 24, also of elongated form, mounted down and within the inside of the open top edge 4 of the container, which closes said container, but leaves said open top edge 4 exposed, and said cutter-cap having a removable and close slip fit down into the inside of said container;
    (b) said elongated cutter-cap having a short flat horizontal surface at each end thereof, and a depression in the form of an elongated finger-well 34 formed between said two short flat horizontal surfaces, the length of said finger-well being at least as great as the combined length of said two short flat horizontal end surfaces;
    (c) a floss feed hole 28 provided in one short, flat horizontal end surface, and a floss cutter blade 30 provided in said other flat horizontal end surface, thus the floss feed hole and the floss cutter blade are widely spaced apart that maximum distance afforded by the length of said elongated cutter-cap disposed on the inside of the container 2, for the convenience of a user when grasping the floss pull-end 23, which is adapted to extend across the length of the elongated finger-well, from the feed hole 28 to the widely spaced cutter blade 30, when withdrawing a useful length of the floss;
    (d) and an elongated lid 10 hinged on the flat rear wall of said container, which closes down over and covers said exposed open top edge 4, and also covers the floss feed hole 28, likewise the floss cutter blade 30, as well as the floss pull-end 23.

3. A dental floss dispenser, as described in claim 2;
    (a) characterized by its removable close slip fit of the cutter-cap 24 within the container 2, which is adapted to be withdrawn from said container;
    (b) and then turned 180° (degrees), replaced in said container 2, and thus adjusted to the left hand side, convenient for a left-hand user of said floss dispenser.

References Cited by the Examiner

UNITED STATES PATENTS

| | | | |
|---|---|---|---|
| 1,174,016 | 2/1916 | Kenyon | 132—92 X |
| 1,210,205 | 12/1916 | Richardson. | |
| 1,427,857 | 9/1922 | Satterlee | 132—92 |
| 1,455,673 | 5/1923 | Shalek | 132—92 X |
| 1,488,810 | 4/1924 | Fraser | 132—92 |
| 1,955,566 | 4/1934 | Schulz | 225—43 |
| 2,251,823 | 8/1941 | Cullen | 225—84 X |
| 2,550,944 | 5/1951 | Stack | 225—41 X |
| 2,601,244 | 6/1952 | Boulicault | 132—92 X |
| 3,002,668 | 10/1961 | Castelli | 225—52 X |

FOREIGN PATENTS 595,432  7/1925  France.

WILLIAM W. DYER, Jr., *Primary Examiner.*

J. M. MEISTER, *Assistant Examiner.*